US012118933B2

(12) United States Patent
Yu

(10) Patent No.: US 12,118,933 B2
(45) Date of Patent: Oct. 15, 2024

(54) PIXEL CIRCUIT, DRIVING METHOD, ELECTROLUMINESCENT DISPLAY PANEL AND DISPLAY APPARATUS

(71) Applicants: Chengdu BOE Optoelectronics Technology Co., Ltd., Sichuan (CN); BOE Technology Group Co., Ltd., Beijing (CN)

(72) Inventor: Ziyang Yu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/515,066

(22) Filed: Oct. 29, 2021

(65) Prior Publication Data

US 2022/0319425 A1 Oct. 6, 2022

(30) Foreign Application Priority Data

Mar. 30, 2021 (CN) ......................... 202110340565.4

(51) Int. Cl.
*G09G 3/3233* (2016.01)

(52) U.S. Cl.
CPC ..... *G09G 3/3233* (2013.01); *G09G 2310/027* (2013.01); *G09G 2310/061* (2013.01); *G09G 2320/0238* (2013.01)

(58) Field of Classification Search
CPC ........... G09G 3/3233; G09G 2310/027; G09G 2310/061; G09G 2320/0238
See application file for complete search history.

(56) References Cited

U.S. PATENT DOCUMENTS

| | | | | |
|---|---|---|---|---|
| 9,330,601 | B2 * | 5/2016 | Lee | G09G 3/3258 |
| 9,601,049 | B2 * | 3/2017 | Park | G09G 3/3233 |
| 9,823,729 | B2 * | 11/2017 | An | G09G 3/3233 |
| 9,886,891 | B2 * | 2/2018 | In | G09G 3/3266 |
| 11,158,258 | B2 * | 10/2021 | Cha | H01L 27/288 |
| 2008/0224621 | A1 | 9/2008 | Uchino et al. | |
| 2012/0098877 | A1 * | 4/2012 | Taro | G09G 3/3225 345/691 |
| 2015/0145849 | A1 * | 5/2015 | Choi | G09G 3/3233 345/212 |
| 2015/0154906 | A1 | 6/2015 | Chung | |
| 2015/0187270 | A1 * | 7/2015 | Lee | G09G 3/3266 345/76 |

(Continued)

FOREIGN PATENT DOCUMENTS

| | | | |
|---|---|---|---|
| CN | 101266750 | A | 9/2008 |
| CN | 103778889 | A | 5/2014 |

(Continued)

*Primary Examiner* — Jeff Piziali
(74) *Attorney, Agent, or Firm* — IPro, PLLC

(57) ABSTRACT

Disclosed are a pixel circuit, a driving method, an electroluminescent display panel and a display apparatus. The pixel circuit includes: a driving control module, a first light emitting control module, a light emitting device and a first capacitor; where the first light emitting control module is coupled between the driving control module and a first electrode of the light emitting device; and the first capacitor is coupled between the light emitting control end and the first electrode of the light emitting device.

12 Claims, 7 Drawing Sheets

(56) References Cited

U.S. PATENT DOCUMENTS

| | | | | |
|---|---|---|---|---|
| 2016/0124491 | A1* | 5/2016 | An | G06F 1/3265 713/323 |
| 2017/0053975 | A1* | 2/2017 | Cho | H01L 27/1288 |
| 2018/0190185 | A1* | 7/2018 | Ko | G09G 3/3233 |
| 2020/0043406 | A1* | 2/2020 | Cha | G09G 3/3233 |
| 2020/0234633 | A1 | 7/2020 | Wang et al. | |
| 2021/0343226 | A1* | 11/2021 | Okabe | G09G 3/2092 |

FOREIGN PATENT DOCUMENTS

| | | | |
|---|---|---|---|
| CN | 106935198 | A | 7/2017 |
| CN | 107146577 | A | 9/2017 |
| CN | 107358914 | A | 11/2017 |
| CN | 108470539 | A | 8/2018 |
| CN | 108492778 | A | 9/2018 |
| CN | 111161674 | A | 5/2020 |
| CN | 112530371 | A | 3/2021 |
| KR | 20180075054 | A | 7/2018 |
| KR | 20190010058 | A | 1/2019 |

* cited by examiner

PIXEL CIRCUIT, DRIVING METHOD, ELECTROLUMINESCENT DISPLAY PANEL AND DISPLAY APPARATUS

The present disclosure claims the priority from Chinese Patent Application No. 202110340565.4, filed with the Chinese Patent Office on Mar. 30, 2021, and entitled "PIXEL CIRCUIT, DRIVING METHOD, ELECTROLUMINESCENT DISPLAY PANEL AND DISPLAY APPARATUS", which is hereby incorporated by reference in its entirety.

FIELD

The present disclosure relates to the technical field of displaying, in particular to a pixel circuit, a driving method, an electroluminescent display panel and a display apparatus.

BACKGROUND

Compared with a liquid crystal display (LCD), an organic light emitting diode (OLED) has the advantages of being low in energy consumption, low in production cost, self-luminous, wide in viewing angle, high in response speed, etc. At present, an OLED display screen has started to replace a traditional LCD display screen in the display field of a mobile phone, a personal digital assistant (PDA), a digital camera, etc. The design of a pixel circuit is a core technology content of an OLED display and has great research significance.

SUMMARY

The present disclosure provides a pixel circuit, a driving method, an electroluminescent display panel and a display apparatus.

In a first aspect, an embodiment of the present disclosure provides a pixel circuit, including: a driving control module, a first light emitting control module, a light emitting device and a first capacitor; where the first light emitting control module is coupled between the driving control module and a first electrode of the light emitting device, and the first light emitting control module is configured to load a driving current provided by the driving control module to the first electrode of the light emitting device under control of a valid light emitting control signal loaded to a light emitting control end; and the first capacitor is coupled between the light emitting control end and the first electrode of the light emitting device, and the first capacitor is configured to control the light emitting device to be in reverse cut-off when an invalid light emitting control signal loaded to the light emitting control end jumps to the valid light emitting control signal and the driving current is smaller than a first preset gray-scale value.

In one implementation, the driving control module includes a drive transistor and a second capacitor; where the second capacitor is coupled between a first power end and a gate of the drive transistor.

In one implementation, the pixel circuit further includes a reset module, a data writing module, a compensation module and a second light emitting control module; where the reset module is coupled with the gate of the drive transistor and the first electrode of the light emitting device, and the reset module is configured to reset the gate of the drive transistor and the first electrode of the light emitting device under control of a reset control signal loaded to a reset signal end;

the data writing module is coupled with a first electrode of the drive transistor and configured to load a data signal to the first electrode of the drive transistor under control of a scanning control signal loaded to a scanning signal end;

the compensation module is coupled between the gate and a second electrode of the drive transistor, and the compensation module is configured to write a threshold voltage of the drive transistor into the gate of the drive transistor under control of the scanning control signal loaded to the scanning signal end; and the second light emitting control module is coupled with the gate of the drive transistor through the second capacitor, and coupled between the first power end and the first electrode of the drive transistor; and the second light emitting control module is configured to load a first electric potential signal provided by the first power end to the first electrode of the drive transistor under control of the valid light emitting control signal loaded to the light emitting control end.

In one implementation, the first light emitting control module includes a first transistor; where a gate of the first transistor is coupled with the light emitting control end, a first electrode of the first transistor is coupled with the second electrode of the drive transistor, and a second electrode of the first transistor is coupled with the first electrode of the light emitting device.

In one implementation, the reset module includes a second transistor and a third transistor; where a gate of the second transistor is coupled with the reset signal end; a first electrode of the second transistor is coupled with the gate of the drive transistor; a second electrode of the second transistor is coupled with an initialization signal end; a gate of the third transistor is coupled with the reset signal end; a first electrode of the third transistor is coupled with the first electrode of the light emitting device; and a second electrode of the third transistor is coupled with the initialization signal end.

In one implementation, the data writing module includes a fourth transistor; where a gate of the fourth transistor is coupled with the scanning signal end; a first electrode of the fourth transistor is coupled with the first electrode of the drive transistor; and a second electrode of the fourth transistor is coupled with a data signal end.

In one implementation, the compensation module includes a fifth transistor; where a gate of the fifth transistor is coupled with the scanning signal end; a first electrode of the fifth transistor is coupled with the gate of the drive transistor; and a second electrode of the fifth transistor is coupled with the second electrode of the drive transistor.

In one implementation, the second light emitting control module includes a sixth transistor; where a gate of the sixth transistor is coupled with the light emitting control end; a first electrode of the sixth transistor is coupled with the first power end; and a second electrode of the sixth transistor is coupled with the first electrode of the drive transistor.

In a second aspect, an embodiment of the present disclosure provides a method for driving the pixel circuit mentioned above, including:

in a first stage, cutting off a first light emitting control module under control of an invalid light emitting control signal loaded to a light emitting control end in a first stage; and in a second stage, when the invalid light emitting control signal loaded to the light emitting control end jumps to a valid light emitting control signal, conducting the first light emitting control module and loading a driving current provided by a driving control module to a first electrode of a light emitting device, and controlling the light emitting device to be in reverse cut-off when the driving current is smaller than a first preset gray-scale value.

In one implementation, the first stage includes a first sub-stage and a second sub-stage, and the method further includes:

in the first sub-stage, cutting off the first light emitting control module and a second light emitting control module under control of the invalid light emitting control signal loaded to the light emitting control end, and resetting a gate of a drive transistor and the first electrode of the light emitting device under control of a reset control signal loaded to a reset signal end; and in the second sub-stage, under control of a scanning control signal loaded to a scanning signal end, loading a data signal to a first electrode of the drive transistor, and writing a threshold voltage of the drive transistor into the gate of the drive transistor.

In one implementation, if the driving current is smaller than a second present gray-scale value, the method further includes:

in the second stage, repeatedly loading the valid light emitting control signal to the light emitting control end.

In a third aspect, an embodiment of the present disclosure further provides an electroluminescent display panel, including: a plurality of pixel circuits arranged in an array mode, where each of the plurality of pixel circuits is the pixel circuit mentioned above.

In a fourth aspect, an embodiment of the present disclosure provides a display apparatus, including: the electroluminescent display panel mentioned above.

DESCRIPTION OF REFERENCE NUMBERS IN ACCOMPANYING DRAWINGS

Figure 1:
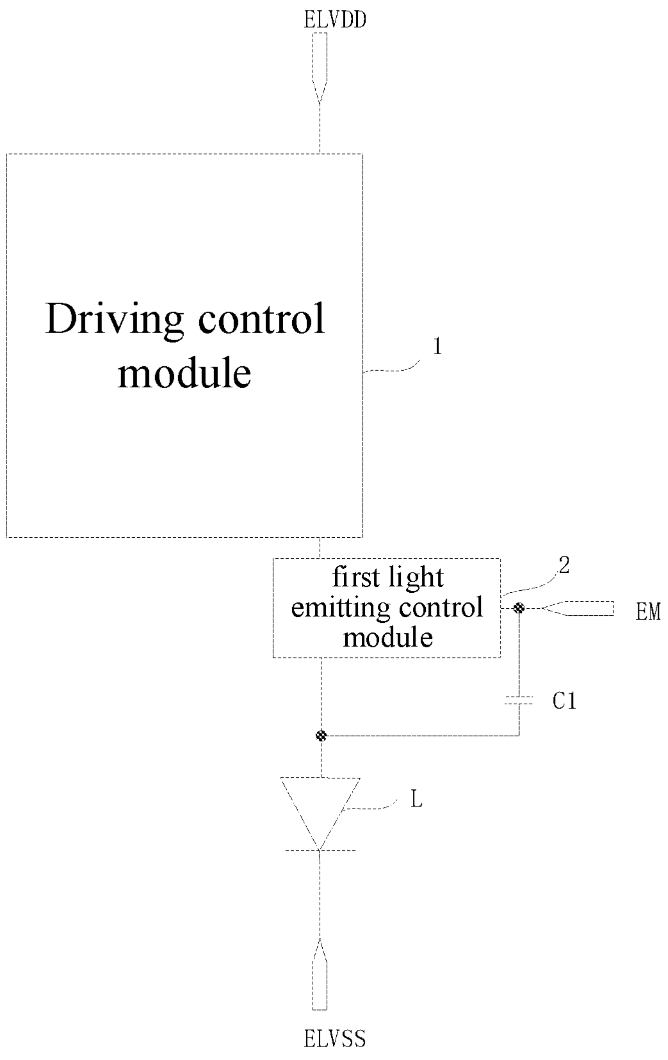
FIG. 1 is a schematic structural diagram of a pixel circuit provided by an embodiment of the present disclosure.

1—driving control module; 2—first light emitting control module; L—light emitting device; C1—first capacitor; ELVSS—first power end; C2—second capacitor; DTFT—drive transistor; 3—reset module; 4—data writing module; 5—compensation module; 6—second light emitting control module; T1—first transistor; T2—second transistor; T3—third transistor; T4—fourth transistor; T5—fifth transistor; T6—sixth transistor; ELVDD—second power end; EM—light emitting control end; RST—reset signal end; GAT—scanning signal end; DATA—data signal end; and Vinit—initialization signal end.

DETAILED DESCRIPTION OF THE EMBODIMENTS

In order to make objectives, technical solutions and advantages of embodiments of the present disclosure clearer, the technical solutions of the embodiments of the present disclosure will be clearly and fully described in combination with the accompanying drawings of the embodiments of the present disclosure. Apparently, the described embodiments are only some, but not all of the embodiments of the present disclosure. The embodiments and features in the embodiments of the present disclosure can be mutually combined under the condition of no conflict. Based on the described embodiments of the present disclosure, all other embodiments obtained by those ordinarily skilled in the art without creative work belong to the protection scope of the present disclosure.

Unless otherwise defined, technical or scientific terms used herein should be understood commonly by those ordinarily skilled in the art of the present disclosure. “Include”, “comprise” and other similar words used herein mean that elements or items preceding the word cover elements or items and their equivalents listed after the word without excluding other elements or items.

It should be noted that sizes and shapes of all figures in the drawings do not reflect a true scale and are only intended to illustrate contents of the present disclosure. Same or similar reference numbers denote same or similar elements or elements with same or similar function all the time.

Currently, a low temperature poly-silicon (LTPS) technique is usually used for fabricating relevant devices in an OLED pixel circuit. Especially, a drive transistor has electric leakage to a certain degree in an off state in most cases and cannot keep stable after working for a long time; and a threshold voltage (Vth) and a mobility may offset under the action of excimer laser anneal (ELA) crystallization, long-time bias voltage, temperature change, etc. In the related art, as for a pixel circuit (such as an existing 7T1C pixel circuit), in a black state, due to electric leakage caused by fabrication technique fluctuations of a transistor (such as the drive transistor) in the pixel circuit or jump coupling of a plurality of signals, electric charge residues usually exist in an anode point of a light emitting device, consequently, light leakage occurs to a certain degree in a black state maintaining stage, a contrast ratio is affected, and even the service life is shortened.

In view of the above, embodiments of the present disclosure provide a pixel circuit, a driving method, an electroluminescent display panel and a display apparatus.

FIG. 1 shows a schematic structural diagram of a pixel circuit provided by an embodiment of the present disclosure, and specifically, the pixel circuit includes:

a driving control module 1, a first light emitting control module 2, a light emitting device L and a first capacitor C1; where, the first light emitting control module 2 is coupled between the driving control module 1 and a first electrode of the light emitting device L, and the first light emitting control module 2 is configured to load a driving current provided by the driving control module 1 to the first electrode of the light emitting device L under control of a valid light emitting control signal loaded to a light emitting control end EM; and the first capacitor C1 is coupled between the light emitting control end EM and the first electrode of the light emitting device L, and the first capacitor C1 is configured to control the light emitting device L to be in reverse cut-off when an invalid light emitting control signal loaded to the light emitting control end EM jumps to the valid light emitting control signal and the driving current is smaller than a first preset gray-scale value.

During specific implementation, the first light emitting control module 2 coupled between the driving control module 1 and the first electrode of the light emitting device L is configured to: load the driving current provided by the driving control module 1 to the first electrode of the light emitting device L under control of the valid light emitting control signal loaded to the light emitting control end EM. For example, when the first light emitting control module 2 is a P-type transistor, the valid light emitting control signal is in a low level; and when the first light emitting control module 2 is an N-type transistor, the valid light emitting control signal is in a high level, in this way, the light emitting device L will emit light under control of the valid light emitting control signal, and thus the display quality is guaranteed. The light emitting device L may be an OLED or an LED. A second electrode of the light emitting device L may be coupled with a second power end ELVSS, the first electrode of the light emitting device L may be an anode, and correspondingly, the second electrode of the light emitting device L may be a cathode.

Besides, the first capacitor C1 coupled between the light emitting control end EM and the first electrode of the light emitting device L is configured to: control the light emitting device L to be in reverse cut-off when the invalid light emitting control signal loaded to the light emitting control end EM jumps to the valid light emitting control signal and the driving current is smaller than the first preset gray-scale value. Where when the first light emitting control module 2 is the P-type transistor, the invalid light emitting control signal is in the high level; when the first light emitting control module 2 is the N-type transistor, the valid light emitting control signal is in the low level; and the first preset gray-scale value may be preset according to actual application. For example, the first preset gray-scale value is a maximum gray-scale value when the pixel circuit is in the black state, in this way, when the pixel circuit is in the black state, the light emitting device L is in reverse cut-off and therefore does not emit light in a case of forward electric leakage, so the contrast ratio is increased. Moreover, when the light emitting device L is in reverse cut-off, interface charges accumulated in the first electrode of the light emitting device L when the light emitting device L is forward conducted to emit light are released, so that aging slows down, and the service life is prolonged.

Specifically, in the pixel circuit provided by the embodiment of the present disclosure, through mutual cooperation of the driving control module 1, the first light emitting control module 2, the light emitting device L and the first capacitor C1, the first capacitor C1 controls the light emitting device L to be in reverse cut-off when the invalid light emitting control signal loaded to the light emitting control end EM jumps to the valid light emitting control signal and the driving current provided by the driving control module 1 and loaded to the first electrode of the light emitting device L is smaller than the first preset gray-scale value. In this way, the light emitting device L is controlled to be in reverse cut-off when the pixel circuit is in the black state, thus a phenomenon of light leakage in the black state is avoided, being more black in the black state is realized, then the contrast ratio is increased, meanwhile device aging slows down, and the service life of the light emitting device L is prolonged.

Figure 2:
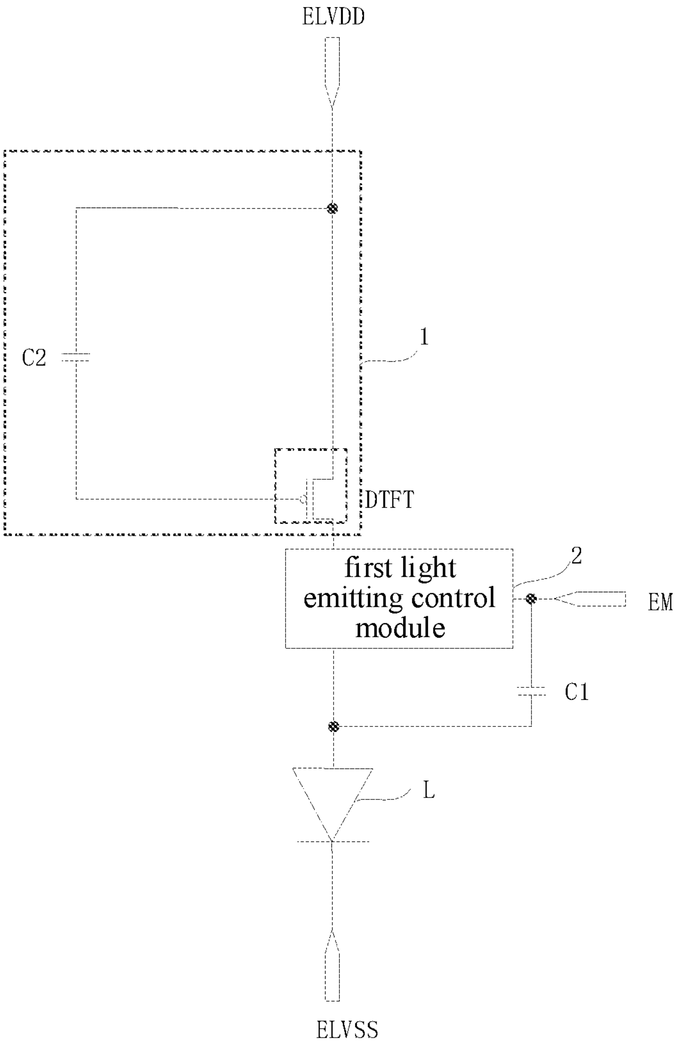
FIG. 2 is a schematic structural diagram of a pixel circuit provided by an embodiment of the present disclosure.

In the embodiment of the present disclosure, as shown in FIG. 2, a schematic structural diagram of a pixel circuit provided by an embodiment of the present disclosure, specifically, the driving control module 1 includes a drive transistor DTFT and a second capacitor C2; where the second capacitor C2 is coupled between a first power end ELVDD and a gate of the drive transistor DTFT. As shown in FIG. 2, a first end of the second capacitor C2 is coupled with the first power end ELVDD, and a second end of the second capacitor C2 is coupled with the gate of the drive transistor DTFT. The drive transistor DTFT may be a P-type transistor or an N-type transistor.

Figure 3:
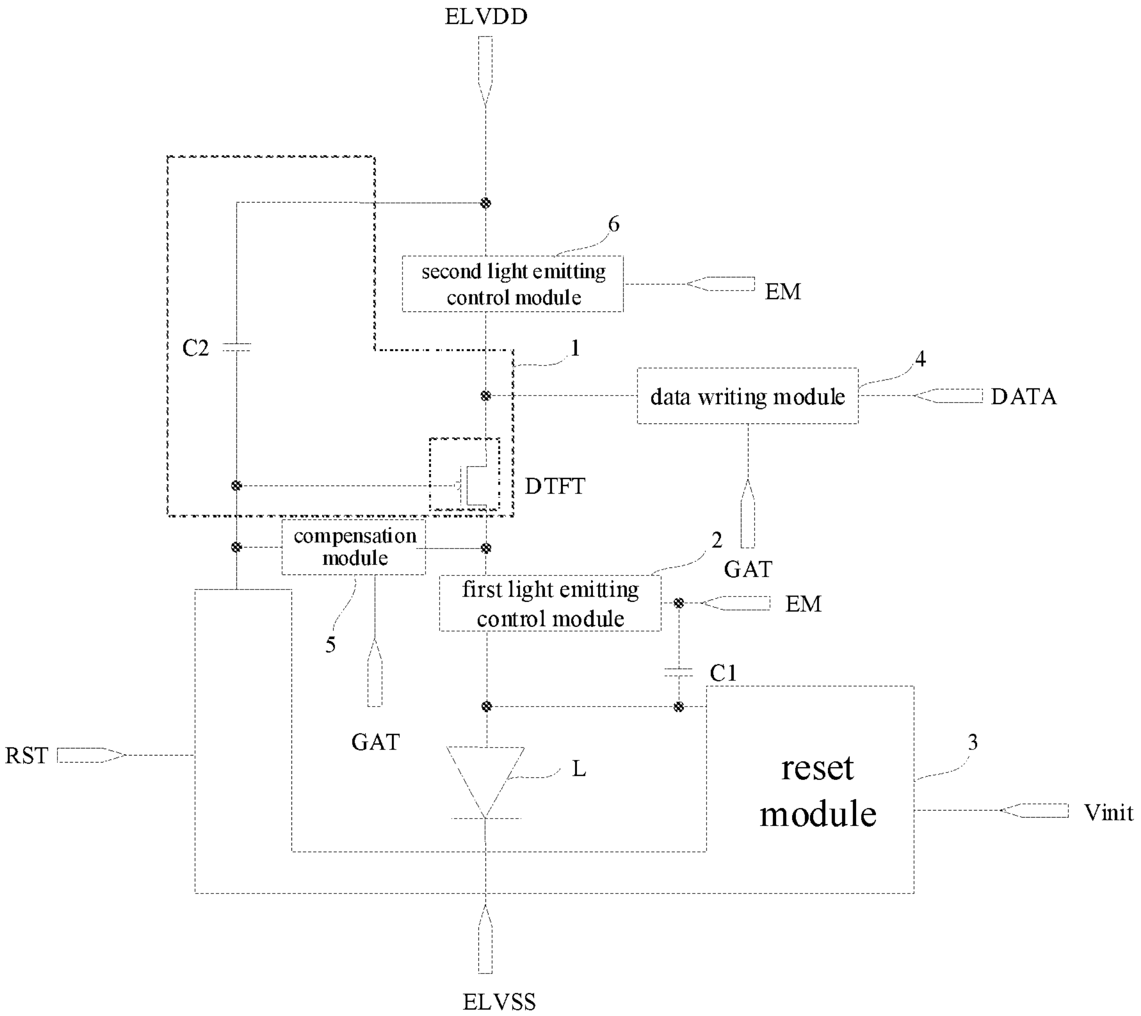
FIG. 3 is a schematic structural diagram of a pixel circuit provided by an embodiment of the present disclosure.

In the embodiment of the present disclosure, as shown in FIG. 3, a schematic structural diagram of a pixel circuit provided by an embodiment of the present disclosure, specifically, the pixel circuit further includes a reset module 3, a data writing module 4, a compensation module 5 and a second light emitting control module 6;

the reset module 3 is coupled with the gate of the drive transistor DTFT and the first electrode of the light emitting device L, and the reset module 3 is configured to reset the gate of the drive transistor DTFT and the first electrode of the light emitting device L under control of a reset control signal loaded to a reset signal end RST;

the data writing module 4 is coupled with a first electrode of the drive transistor DTFT, and the data writing module 4 is configured to load a data signal to the first electrode of the drive transistor DTFT under control of a scanning control signal loaded to a scanning signal end GAT;

the compensation module 5 is coupled between the gate and a second electrode of the drive transistor DTFT, and the compensation module 5 is configured to write a threshold voltage of the drive transistor DTFT into the gate of the drive transistor DTFT under control of the scanning control signal loaded to the scanning signal end GAT; and the second light emitting control module 6 is coupled with the gate of the drive transistor DTFT through the second capacitor C2, and coupled between the first power end ELVDD and the first electrode of the drive transistor DTFT; and the second light emitting control module 6 is configured to load a first electric potential signal provided by the first power end ELVDD to the first electrode of the drive transistor DTFT under control of the valid light emitting control signal loaded to the light emitting control end EM.

During specific implementation, the first electric potential signal provided by the first power end ELVDD may be a high potential signal, and correspondingly, a second electric potential signal provided by the second power end ELVSS may be a low potential signal.

Figure 4:
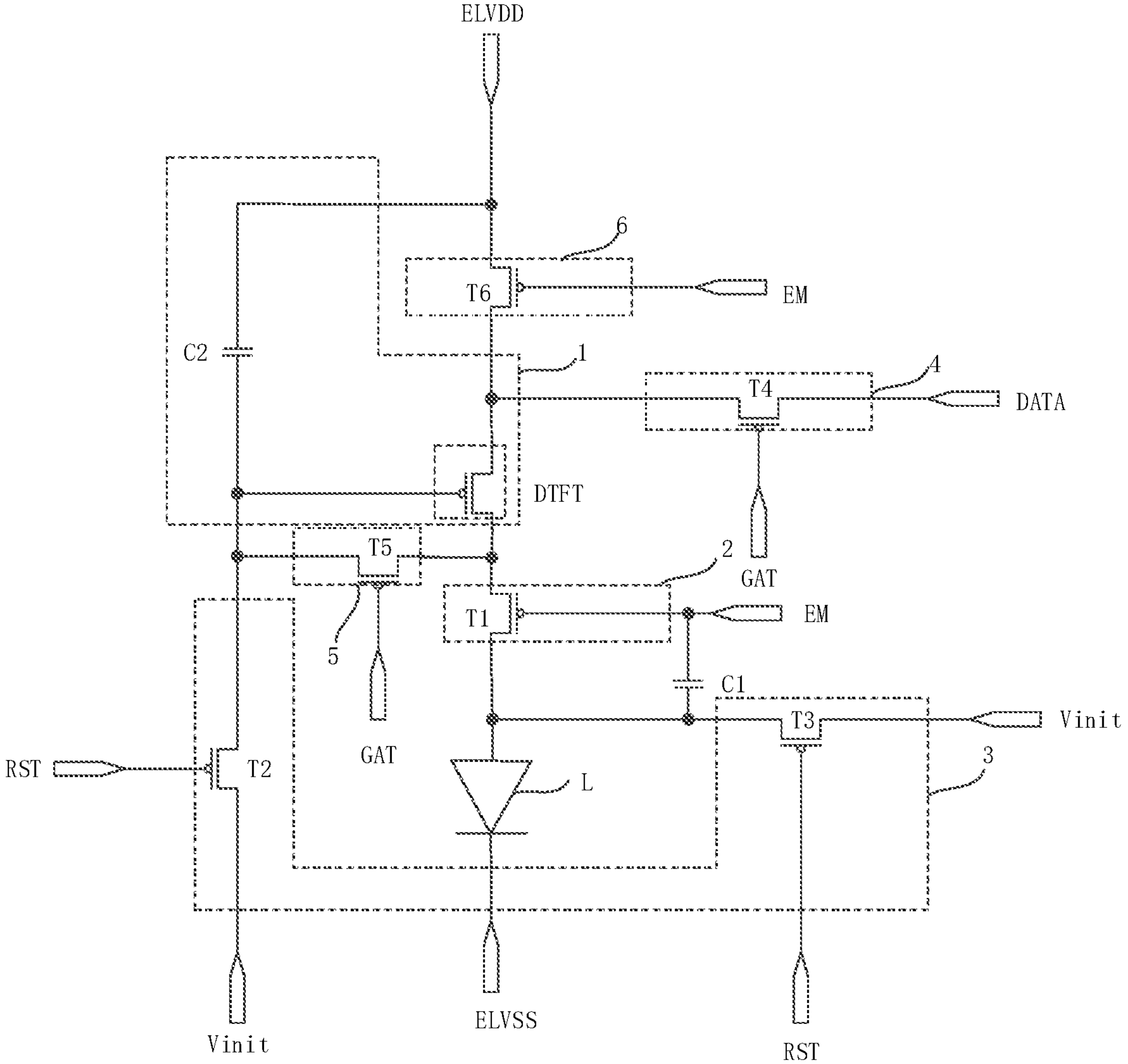
FIG. 4 is a schematic structural diagram of a pixel circuit provided by an embodiment of the present disclosure.

In the embodiment of the present disclosure, as shown in FIG. 4, a schematic structural diagram of a pixel circuit provided by an embodiment of the present disclosure, specifically, the first light emitting control module 2 includes a first transistor T1; a gate of the first transistor T1 is coupled with the light emitting control end EM, a first electrode of the first transistor T1 is coupled with the second electrode of the drive transistor DTFT, and a second electrode of the first transistor T1 is coupled with the first electrode of the light emitting device L.

During specific implementation, the first transistor T1 may be a P-type transistor; when the light emitting control signal provided by the light emitting control end EM is in the low level, the first transistor T1 is in a conductive state; and when the light emitting control signal provided by the light emitting control end EM is in the high level, the first transistor T1 is in a cut-off state. Alternatively, the first transistor T1 may be an N-type transistor; when the light emitting control signal provided by the light emitting control end EM is in the low level, the first transistor T1 is in the cut-off state; and when the light emitting control signal provided by the light emitting control end EM is in the high level, the first transistor T1 is in the conducting state. In actual application, those skilled in the art may select the first transistor T1 according to specific demands, which is not limited herein.

As shown in FIG. 4, the reset module 3 includes a second transistor T2 and a third transistor T3; a gate of the second transistor T2 is coupled with the reset signal end RST; a first electrode of the second transistor T2 is coupled with the gate of the drive transistor DTFT; a second electrode of the second transistor T2 is coupled with an initialization signal end Vinit; a gate of the third transistor T3 is coupled with the reset signal end RST; a first electrode of the third transistor T3 is coupled with the first electrode of the light emitting device L; and a second electrode of the third transistor T3 is coupled with the initialization signal end Vinit.

In the embodiment of the present disclosure, if both the second transistor T2 and the third transistor T3 are P-type transistors, at the moment, when a reset control signal provided by the reset signal end RST is in the low level, the second transistor T2 and the third transistor T3 are in the conducting state; and when the reset control signal provided by the reset signal end RST is in the high level, the second transistor T2 and the third transistor T3 are in the cut-off state. Alternatively, both the second transistor T2 and the third transistor T3 may be N-type transistors, when the reset control signal provided by the reset signal end RST is in the high level, the second transistor T2 and the third transistor T3 are in the conducting state; and when the reset control signal provided by the reset signal end RST are in the low level, both the second transistor T2 and the third transistor T3 are in the cut-off state.

Specifically, when the second transistor T2 and the third transistor T3 are in the conducting state under control of the reset control signal of the reset signal end RST, an initialization signal provided by the initialization signal end Vinit is transmitted to the gate of the drive transistor DTFT through the conducted second transistor T2 and to the first electrode of the light emitting device L through the conducted third transistor T3, so that a voltage of the gate of the drive transistor DTFT and a voltage of the first electrode of the light emitting device L are reset respectively.

As shown in FIG. 4, the data writing module 4 includes a fourth transistor T4; a gate of the fourth transistor T4 is coupled with the scanning signal end GAT, a first electrode of the fourth transistor T4 is coupled with the first electrode of the drive transistor DTFT, and a second electrode of the fourth transistor T4 is coupled with the data signal end DATA.

During specific implementation, the fourth transistor T4 may be a P-type transistor, at the moment, when the scanning control signal provided by the scanning signal end GAT is in the low level, the fourth transistor T4 is in the conducted state; and when the scanning control signal provided by the scanning signal end GAT is in the high level, the fourth transistor T4 is in the cut-off state. Alternatively, the fourth transistor T4 may be an N-type transistor; when the scanning control signal provided by the scanning signal end GAT is in the high level, the fourth transistor T4 is in the conducting state; and when the scanning control signal provided by the scanning signal end GAT is in the low level, the fourth transistor T4 is in the cut-off state.

Specifically, when the fourth transistor T4 is in the conducting state under control of the scanning signal end GAT, the data signal provided by the data signal end DATA is transmitted to the first electrode of the drive transistor DTFT through the conducted fourth transistor T4, so that the data signal to the first electrode of the drive transistor DTFT is loaded.

As shown in FIG. 4, the compensation module 5 includes a fifth transistor T5; a gate of the fifth transistor T5 is coupled with the scanning signal end GAT, a first electrode of the fifth transistor T5 is coupled with the gate of the drive transistor DTFT, and a second electrode of the fifth transistor T5 is coupled with the second electrode of the drive transistor DTFT.

During specific implementation, the fifth transistor T5 may be a P-type transistor, at the moment, when the scanning control signal provided by the scanning signal end GAT is in the low level, the fifth transistor T5 is in the conducting state; and when the scanning control signal provided by the scanning signal end GAT is in the high level, the fifth transistor T5 is in the cut-off state. Alternatively, the fifth transistor T5 may be an N-type transistor, when the scanning control signal provided by the scanning signal end GAT is in the high level, the fifth transistor T5 is in the conducting state; and when the scanning control signal provided by the scanning signal end GAT is in the low level, the fifth transistor T5 is in the cut-off state.

Specifically, when the fifth transistor T5 is in the conducting state under control of the scanning control signal provided by the scanning signal end GAT, the fifth transistor T5 writes the threshold voltage of the drive transistor DTFT into the gate of the drive transistor DTFT.

In the embodiment of the present disclosure, as shown in FIG. 4, the second light emitting control module 6 includes a sixth transistor T6; a gate of the sixth transistor T6 is coupled with the light emitting control end EM; a first electrode of the sixth transistor T6 is coupled with the first power end ELVDD; and a second electrode of the sixth transistor T6 is coupled with the first electrode of the drive transistor DTFT.

During specific implementation, the sixth transistor T6 may be a P-type transistor, at the moment, when the light emitting control signal provided by the light emitting control end EM is in the low level, the sixth transistor T6 is in the conducting state; and when the light emitting control signal provided by the light emitting control end EM is in the high level, the sixth transistor T6 is in the cut-off state. Alternatively, the sixth transistor T6 may be an N-type transistor, at the moment, when the light emitting control signal provided by the light emitting control end EM is in the low level, the sixth transistor T6 is in the cut-off state; and when the light emitting control signal provided by the light emitting control end EM is in the high level, the sixth transistor T6 is in the conducting state.

It needs to be noted that functions of the first electrode and the second electrode of the first transistor T1 may be interchanged according to the type of the first transistor and different signals of the signal ends; for example, the first electrode may be a source, and correspondingly, the second electrode is a drain; alternatively, the first electrode is a drain, and correspondingly, the second electrode is a source, which is not limited herein. Likewise, the first electrodes and the second electrodes of the other transistors in the above pixel circuit may be set according to their types and the different signals of the signal ends. In the pixel circuit provided by the embodiments of the present disclosure, the drive transistor DTFT and the other transistors may be a thin film transistor (TFT), or a metal oxide semiconductor (MOS) field-effect transistor and will not be limited herein. All the transistors may be P-type transistors or N-type transistors. Optionally, each of the transistors mentioned in the pixel circuit provided by the embodiments of the present disclosure may be designed as the P-type transistor, so that a fabrication technique flow of the pixel circuit is simplified.

A working process of the pixel circuit provided by the embodiments of the present disclosure is described below according to the pixel circuit shown in FIG. 4 and a time sequence shown in FIG. 5. The initialization signal provided by the initialization signal end Vinit is a low level signal, e.g., −3V; the first electric potential signal provided by the first power end ELVDD is a low level signal, the second electric potential signal provided by the second power end ELVSS is a high level signal, and all the transistors are P-type transistors.

In a first stage t1, EM(n)=1, RST=0, GAT=1, and DATA=1.

In the first stage t1, the light emitting control signal provided by the light emitting control end EM is in a high level, and the first transistor T1 and the sixth transistor T6 are cut off; the scanning control signal provided by the scanning signal end GAT is in the high level, and the fourth transistor T4 and the fifth transistor T5 are cut off; the reset control signal of the reset signal end RST is in a low level, and the second transistor T2 and the third transistor T3 are conducted; and the initialization signal provided by the initialization signal end Vinit is provided for the gate of the drive transistor DTFT and the first electrode of the light emitting device L and correspondingly, the gate of the drive transistor DTFT and the first electrode of the light emitting device L are initialized. Because the first transistor T1 and the sixth transistor T6 are in the cut-off state, the light emitting device L does not emit light.

In a second stage t2, EM(n)=1, RST=1, GAT=0, and DATA=1.

In the second stage t2, the reset control signal provided by the reset signal end is in the high level, the second transistor T2 and the third transistor T3 are cut off; the scanning control signal provided by the scanning signal end GAT is a low level signal, and the fourth transistor T4 and the fifth transistor T5 are conducted. The fifth transistor T5 conducts the gate and the second electrode of the drive transistor DTFT, the drive transistor DTFT forms a diode structure, and point charges of the gate of the drive transistor DTFT flow to the data signal end DATA through the fifth transistor T5, the drive transistor DTFT and the fourth transistor T4. Finally, a gate voltage VDTFT of the drive transistor DTFT meets an equation: $VDTFT=Vdata+V_{th}$, where Vth is the threshold voltage of the drive transistor DTFT, and a conducting voltage of the sixth transistor T6 meets an equation: $V_{gs}=VDTFT-ELVDD=Vdata+V_{th}-ELVDD$.

In a third stage t3, EM(n)=0, RST=1, GAT=1, and DATA=1.

In the third stage t3, the reset control signal provided by the reset signal end is in the high level, and the second transistor T2 and the third transistor T3 are cut off; the scanning control signal provided by the scanning signal end GAT is in the high level, and the fourth transistor T4 and the fifth transistor T5 are cut off; and the light emitting control signal provided by the light emitting control end EM is in the low level, and the first transistor T1 and the sixth transistor T6 are conducted. When the light emitting control signal is the valid light emitting control signal, in an ideal case without regard to external factors such as stray capacitance and leakage current in the pixel circuit, the driving current Id flowing through the light emitting device L meets an equation:

$$Id=\frac{1}{2}*\mu*C_{ox}*\frac{W}{L}*(V_{gs}-V_{th})^2=\frac{k}{2}(V\text{data}-ELVDD)^2$$

where μ represents a mobility, $C_{ox}$ represents insulation layer capacitance, and the both parameters are constants in a fixed technique; and W/L represents a width-to-length ratio of the drive transistor DTFT, which is a constant in the fixed technique.

Figure 5:
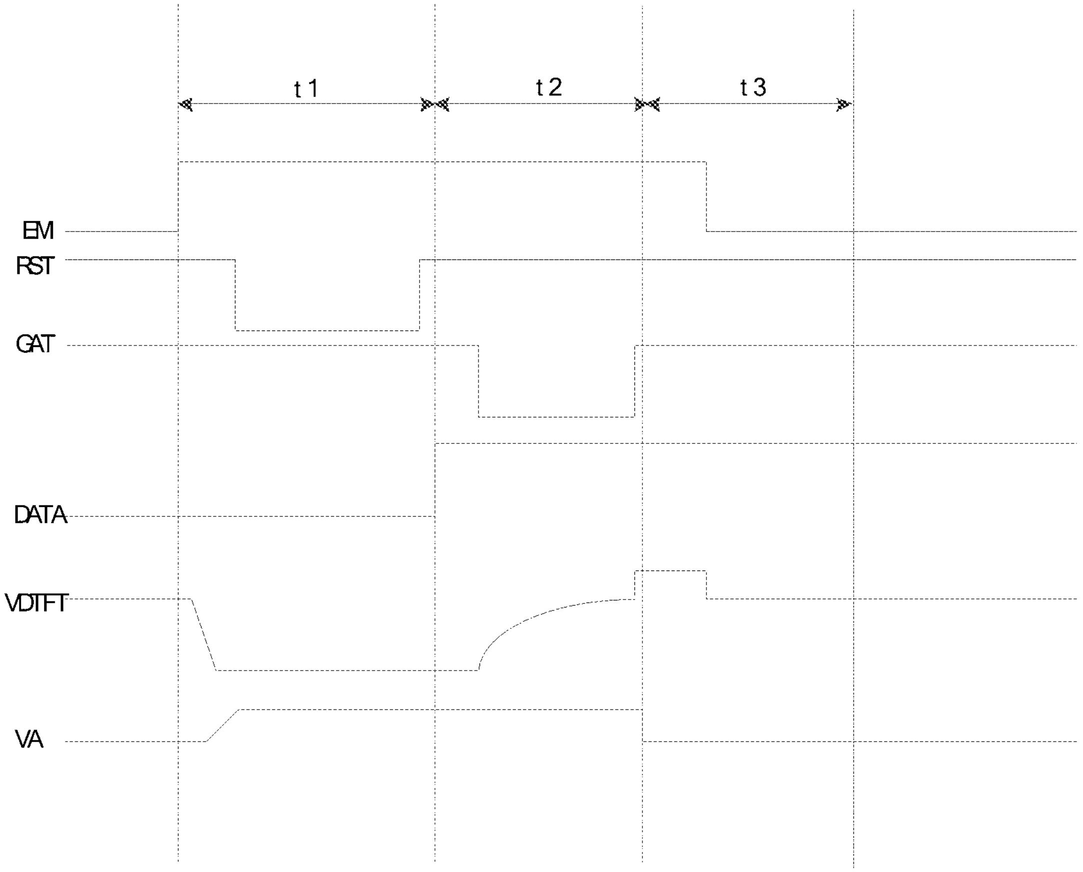
FIG. 5 is a time sequence chart corresponding to the pixel circuit shown in FIG. 4.

Besides, FIG. 5 further shows a time sequence change of VDTFT and a time sequence change of a voltage VA of the first electrode of the light emitting device L.

When a black picture is displayed through the pixel circuit, in the third stage t3, the light emitting control signal of the light emitting control end EM jumps from the high level to the low level, and coupling with the first electrode of the light emitting device L is performed through the first capacitor C1, so that the light emitting device L is always in reverse cut-off in a process of keeping the black state and does not emit light in a case of forward electric leakage, namely, the light emitting device L in reverse cut-off does not emit light. Thus the brightness of the black state is reduced effectively, the contrast ratio is increased, meanwhile, interface charges accumulated when the light emitting device L is forwards conducted to emit light may be released in reverse cut-off, then aging slows down, and the service life of the light emitting device L is prolonged.

Besides, in the related art, as for a middle gray scale and a low gray scale, due to the influence of the parasitic capacitance, when the valid light emitting control signal is loaded to the light emitting control end EM, a light emitting starting speed of the light emitting device L is low, consequently, a problem of flickering is prone to occurring to a black picture of the middle gray scale and the low gray scale during low-frequency displaying. However, in the embodiment of the present disclosure, if the driving current provided by the driving control module 1 is smaller than a second preset gray-scale value, where the second preset gray-scale value is preset according to actual application demands, for example, the second preset gray-scale value is a maximum gray-scale value during low-gray-scale displaying of the pixel circuit; during low-gray-scale displaying, in the third stage, the valid light emitting control signal is repeatedly loaded to the light emitting control end EM; for example, when the pixel circuit displays a low-gray-scale picture, in the third stage, the valid light emitting control signal is repeatedly loaded to the light emitting control end EM. In this way, in a process that the light emitting control signal provided by the light emitting control end EM jumps from the high level to the low level, the voltage of the first electrode of the light emitting device L may be decreased through the first capacitor C1, thus the light emitting brightness is reduced, and then the light emitting brightness is recovered slowly. Taking a light emitting control signal of 30 Hz 4 pulses for example, the voltage of the first electrode of the light emitting device L is decreased for four times within one frame, corresponding to four-time reduction and recovery of the brightness of the light emitting device L, the brightness change is increased from one time to four times within one frame; in this way, a screen brightness change frequency will be increased from 30 Hz to 120 Hz, thus low-gray-scale flickering is greatly reduced, and the displaying quality is improved.

Figure 6:
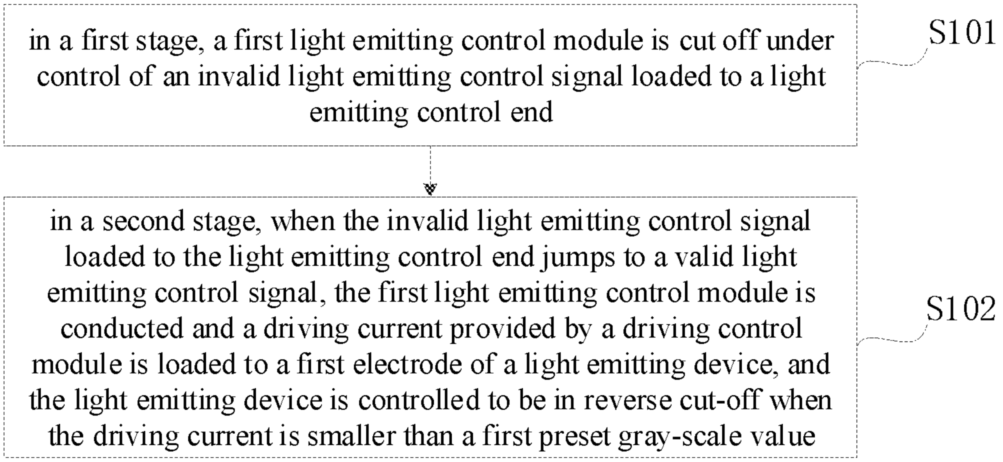
FIG. 6 is a flow chart of a driving method of a pixel circuit provided by an embodiment of the present disclosure.

Based on the same inventive concept, as shown in FIG. 6, a flow chart of a driving method of a pixel circuit provided by an embodiment of the present disclosure, specifically, the driving method includes the following.

S101: in a first stage, a first light emitting control module is cut off under control of an invalid light emitting control signal loaded to a light emitting control end.

S102: in a second stage, when the invalid light emitting control signal loaded to the light emitting control end jumps to a valid light emitting control signal, the first light emitting control module is conducted and a driving current provided by a driving control module is loaded to a first electrode of a light emitting device, and the light emitting device is controlled to be in reverse cut-off when the driving current is smaller than a first preset gray-scale value.

During specific implementation, a structure of a pixel circuit in the driving method may be referred to the above relevant description of the pixel circuit and will not be detailed herein. A specific implementation process from S101 to S102 may be referred to the above relevant description of the pixel circuit and will not be detailed herein.

Figure 7:
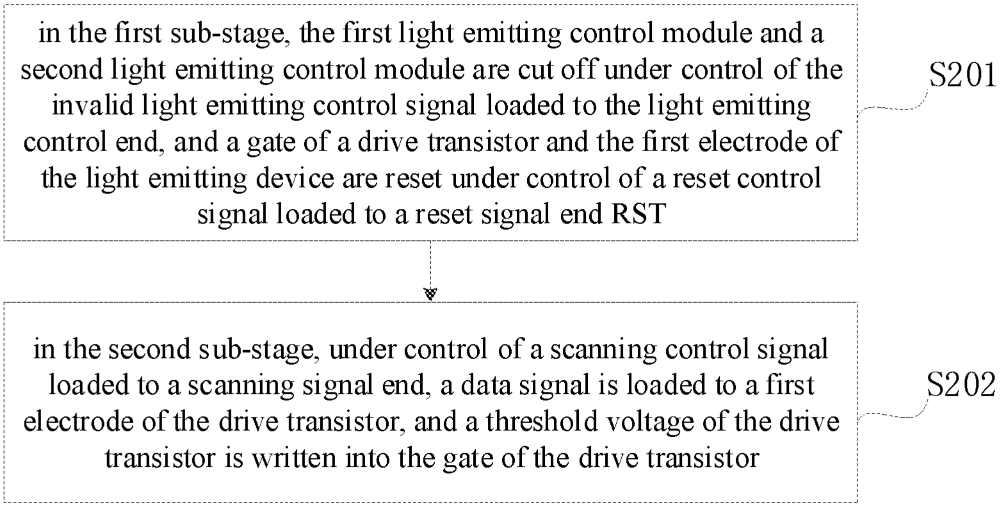
FIG. 7 is a flow chart of S101 in a driving method of a pixel circuit provided by an embodiment of the present disclosure.

During specific implementation, as shown in FIG. 7, a flow chart of S101 as a first stage includes a first sub-stage and a second sub-stage, specifically, the driving method includes the following.

S201: in the first sub-stage, the first light emitting control module and a second light emitting control module are cut off under control of the invalid light emitting control signal loaded to the light emitting control end, and a gate of a drive transistor and the first electrode of the light emitting device are reset under control of a reset control signal loaded to a reset signal end RST.

S202: in the second sub-stage, under control of a scanning control signal loaded to a scanning signal end, a data signal is loaded to a first electrode of the drive transistor, and a threshold voltage of the drive transistor is written into the gate of the drive transistor.

A specific implementation process from S201 to S202 may be referred to the above relevant description of the pixel circuit and will not be detailed herein.

In the embodiment of the present disclosure, if the driving current is smaller than a second present gray-scale value, the method further includes:

in the second stage, the valid light emitting control signal is repeatedly loaded to the light emitting control end.

Based on the same inventive concept, an embodiment of the present disclosure further provides an electroluminescent display panel, including: a plurality of pixel circuits arranged in an array mode, where each of the plurality of pixel circuits is the pixel circuit according to any one of the embodiments mentioned above.

Based on the same inventive concept, an embodiment of the present disclosure further provides a display apparatus, including the electroluminescent display panel mentioned above. A principle of solving problems of the display apparatus is similar to a principle of solving problems of the aforementioned pixel circuit, so that implementation of the display apparatus may be referred to that of the aforementioned pixel circuit, and repetitions are omitted herein.

During specific implementation, the display apparatus provided by the embodiment of the present disclosure may be a mobile phone, a tablet PC, a TV, a display, a laptop, a digital photo frame, a navigator and any other products or parts with a displaying function. Other essential components of the display apparatus should be understood by those of ordinary skill in the art and will be neither detailed herein nor supposed to limit the present disclosure.

Though the preferred embodiments of the present disclosure are already described, those skilled in the art can make other changes and modifications for these embodiments once they know the basic inventive concept. Therefore, the appended claims intend to be constructed as including the preferred embodiments and all the changes and modifications in the scope of the present disclosure.

Apparently, those skilled in the art can make various changes and modifications without departing from the spirit and scope of the present application. In this case, if these changes and modifications of the present application fall in the scope of the claims and their equivalents, the present application also intends to include these changes and modifications.

What is claimed is:

1. A pixel circuit, comprising: a driving control module, a first light emitting control module, a light emitting device and a first capacitor; wherein, the first light emitting control module is coupled between the driving control module and a first electrode of the light emitting device, and the first light emitting control module is configured to load a driving current provided by the driving control module to the first electrode of the light emitting device under control of a valid light emitting control signal loaded to a light emitting control end; and a first end of the first capacitor is coupled with the light emitting control end, and a second end of the first capacitor is directly coupled with the first electrode of the light emitting device; and the first capacitor is configured to control the light emitting device to be in reverse cut-off when an invalid light emitting control signal loaded to the light emitting control end jumps to the valid light emitting control signal to make the light emitting device enter a luminescent period from a non-luminescent period and the driving current loaded to the first electrode of the light emitting device is smaller than a first preset gray-scale value;

wherein the first preset gray-scale value is a maximum gray-scale value when the pixel circuit is in a black state;

wherein in a case that the driving current loaded to the first electrode of the light emitting device is smaller than a second preset gray-scale value, the valid light emitting control signal is repeatedly loaded to the light emitting control end, and the light emitting control end jumps from the invalid light emitting control signal to the valid light emitting control signal multiple times;

wherein each time the light emitting control end jumps from the invalid light emitting control signal to the valid light emitting control signal, a voltage of the first electrode of the light emitting device is decreased for one time through the first capacitor, and brightness of the light emitting device has one-time reduction;

wherein the driving control module comprises a drive transistor and a second capacitor;

wherein the second capacitor is coupled between a first power end and a gate of the drive transistor.

2. The pixel circuit according to claim 1, further comprising a reset module, a data writing module, a compensation module and a second light emitting control module; wherein, the reset module is coupled with the gate of the drive transistor and the first electrode of the light emitting device, and the reset module is configured to reset the gate of the drive transistor and the first electrode of the light emitting device under control of a reset control signal loaded to a reset signal end;

the data writing module is coupled with a first electrode of the drive transistor, and the data writing module is configured to load a data signal to the first electrode of the drive transistor under control of a scanning control signal loaded to a scanning signal end;

the compensation module is coupled between the gate and a second electrode of the drive transistor, and the compensation module is configured to write a threshold voltage of the drive transistor into the gate of the drive transistor under control of the scanning control signal loaded to the scanning signal end; and the second light emitting control module is coupled with the gate of the drive transistor through the second capacitor, and coupled between the first power end and the first electrode of the drive transistor; and the second light emitting control module is configured to load a first electric potential signal provided by the first power end to the first electrode of the drive transistor under control of the valid light emitting control signal loaded to the light emitting control end.

3. The pixel circuit according to claim 2, wherein the first light emitting control module comprises a first transistor;

wherein a gate of the first transistor is coupled with the light emitting control end, a first electrode of the first transistor is coupled with the second electrode of the drive transistor, and a second electrode of the first transistor is coupled with the first electrode of the light emitting device.

4. The pixel circuit according to claim 2, wherein the reset module comprises a second transistor and a third transistor, wherein a gate of the second transistor is coupled with the reset signal end; a first electrode of the second transistor is coupled with the gate of the drive transistor; a second electrode of the second transistor is coupled with an initialization signal end; and a gate of the third transistor is coupled with the reset signal end; a first electrode of the third transistor is coupled with the first electrode of the light emitting device; and a second electrode of the third transistor is coupled with the initialization signal end.

5. The pixel circuit according to claim 2, wherein the data writing module comprises a fourth transistor;

wherein a gate of the fourth transistor is coupled with the scanning signal end; a first electrode of the fourth transistor is coupled with the first electrode of the drive transistor; and a second electrode of the fourth transistor is coupled with a data signal end.

6. The pixel circuit according to claim 2, wherein the compensation module comprises a fifth transistor;

wherein a gate of the fifth transistor is coupled with the scanning signal end; a first electrode of the fifth transistor is coupled with the gate of the drive transistor; and a second electrode of the fifth transistor is coupled with the second electrode of the drive transistor.

7. The pixel circuit according to claim 2, wherein the second light emitting control module comprises a sixth transistor;

wherein a gate of the sixth transistor is coupled with the light emitting control end; a first electrode of the sixth transistor is coupled with the first power end; and a second electrode of the sixth transistor is coupled with the first electrode of the drive transistor.

8. A method for driving the pixel circuit according to claim 1, comprising:

in a first stage, cutting off the first light emitting control module under control of the invalid light emitting control signal loaded to the light emitting control end; and in a second stage, when the invalid light emitting control signal loaded to the light emitting control end jumps to the valid light emitting control signal, conducting the first light emitting control module and loading the driving current provided by the driving control module to the first electrode of the light emitting device, and controlling the light emitting device to be in reverse cut-off when the driving current is smaller than a first preset gray-scale value.

9. The method according to claim 8, wherein the first stage comprises a first sub-stage and a second sub-stage; wherein the method further comprises:

in the first sub-stage, cutting off the first light emitting control module and a second light emitting control module under control of the invalid light emitting control signal loaded to the light emitting control end, and resetting a gate of a drive transistor and the first electrode of the light emitting device under control of a reset control signal loaded to a reset signal end; and in the second sub-stage, under control of a scanning control signal loaded to a scanning signal end, loading a data signal to a first electrode of the drive transistor, and writing a threshold voltage of the drive transistor into the gate of the drive transistor.

10. The method according to claim 8, wherein in the case that the driving current is smaller than the second preset gray-scale value, the method further comprises:

in the second stage, repeatedly loading the valid light emitting control signal to the light emitting control end.

11. An electroluminescent display panel, comprising: a plurality of pixel circuits arranged in an array mode, wherein each of the plurality of pixel circuits is the pixel circuit according to claim 1.

12. A display apparatus, comprising: the electroluminescent display panel according to claim 11.

* * * * *